Oct. 12, 1965   F. S. SADLER   3,211,516
THERMALLY STABILIZED CELLULOSE MATERIALS
Filed July 16, 1962
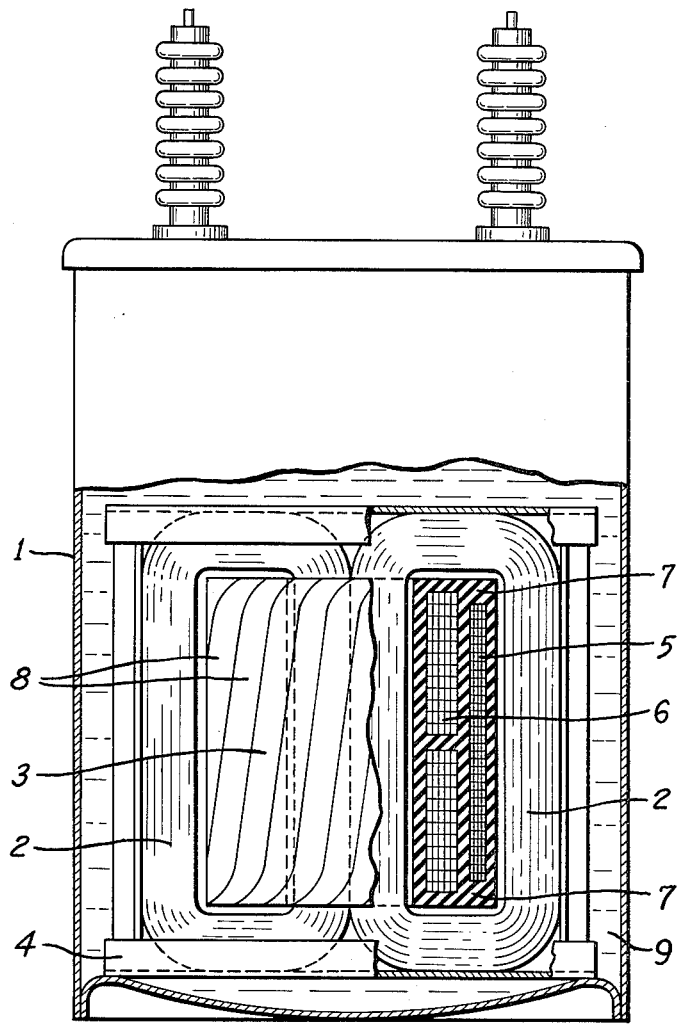
INVENTOR.
FRED S. SADLER
BY
Andrus & Starke
ATTORNEYS

United States Patent Office 3,211,516
Patented Oct. 12, 1965

3,211,516
THERMALLY STABILIZED CELLULOSE
MATERIALS
Fred S. Sadler, Orange, N.J., assignor to McGraw-Edison
Company, Milwaukee, Wis., a corporation of Delaware
Filed July 16, 1962, Ser. No. 209,853
17 Claims. (Cl. 8—116.2)

This invention relates to cellulosic materials having improved thermal stability and more particularly to cellulosic materials to be used as insulation in electrical apparatus.

Cellulose fibers tend to deteriorate when subjected to elevated temperatures for extended periods of time. This presents a very serious problem with respect to many applications of cellulosic materials. For example, the problem is encountered in using cellulose fiber cord type reinforcing in rubber articles, such as pneumatic tires, steam hoses, conveyor belts and the like. It is also encountered in electrical apparatus employing cellulose insulation materials.

Cellulose fiber reinforced rubber articles are subjected to elevated temperatures in normal use, either from external heat, or from heat which is generated internally by reason of repeated rapid flexing, as in the case of pneumatic tires. The resultant deterioration of the reinforcing fibers is evidenced by a progressive reduction in their strength until eventually they fracture. This constitutes a principal cause of failure of such articles as pneumatic tires and steam hose.

Cellulose insulation materials which are used extensively in electrical apparatus are also subjected to elevated temperatures in use. Here, however, the deterioration problem is increased by other factors, particularly where the insulation materials are in contact with, or immersed in, liquid dielectrics such as transformer oils. The elevated temperatures may cause the liquid dielectrics to break down into their chemical constituents, and the resultant deterioration products may in turn attack the cellulose insulation materials. For this reason, cellulose insulation materials in contact with liquid dielectrics generally deteriorate at a far greater rate than they would if they were not in contact with such liquids.

The present invention is directed to cellulose fibers to be used as internal reinforcement for insulation having improved thermal stability and which will resist deterioration or decomposition at elevated temperatures.

According to the invention, the cellulose fibers are impregnated with a cyclic diamine, such as piperazine, aminoethyl piperazine or the like. In addition, the thermal stabilization of the cellulose materials can be improved by incorporating a protein or aminized starch and a phenolic compound with the cyclic diamine. This treatment greatly improves the ability of the cellulose fibers to withstand the deteriorating action of heat over extended periods of time. It has been found that by this method of treating the cellulose fibers, the fibers are not only protected against thermal deterioration, but are also stabilized against attack from decomposition products of the transformer oil or other liquid dielectrics. For this reason cellulose insulation materials treated in accordance with the invention are particularly well adapted for use in oil filled transformers and other similar electrical apparatus.

Other objects and advantages will appear in the course of the following description.

The drawing is a sectional view of a transformer embodying cellulose insulation which has been treated in accordance with the invention.

The transformer, as shown in the drawing, is encased within a tank 1 and consists of a magnetic core 2 and a coil 3, both of which are supported in spaced relation from the bottom of the tank 1 by channel support members 4 or the like. The coil 3 comprises a high voltage winding 5 and a low voltage winding 6 which are insulated from one another by the treated cellulose insulation 7. A treated cellulose wrapping 8 may also be applied to the exterior of the coil 3. A dielectric liquid 9 comprising oil, chlorinated diphenyl, or the like is disposed within the tank 1 to cover the core 2 and the coil 3 in order to insulate them and to dissipate the heat generated during operation.

The cellulose insulating materials 7 and 8 may be composed of rag, kraft or manilla paper or other cellulosic material, such as rayon or the like. The cellulose insulating material is treated with a cyclic diamine having the formula:

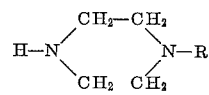

where R is either a hydrogen atom or an alkyl group containing from 1 to 6 carbon atoms.

Specific examples of the diamines to be used are piperazine, amino ethyl piperazine, and the like.

It is preferred to employ a protein or aminized starch in combination with the cyclic diamine. The protein is a water soluble, non-fibrous, protein material having a low molecular weight. As the ingredients are applied to the cellulose fibers in the form of a solution, the low molecular weight protein will provide the solution with a relatively low viscosity which will aid in impregnating the fibers. Examples of protein materials which can be employed are isolated soy protein sold by Archer-Daniels-Midland Company of Cincinnati, Ohio, under the trademark Adpro 410, casein, and the like. Cationic or aminized starch, such as Ceron CN, containing approximately 0.23% nitrogen can be substituted for the protein.

The thermal stabilization of the cellulose material can also be improved by incorporating a phenolic compound with the diamine and protein or starch. The phenolic compound can be any water soluble phenol having antioxidant properties, such as phenol, acetyl p-aminophenol, m-cresol, p-aminophenol, and the like.

The diamine, protein and the phenolic compound, if employed, are preferably applied to the cellulose fibers in the form of an aqueous solution. The solution can be applied to the cellulose fibers either by spraying, brushing, dipping, size press addition, or the like. During the treating process, the solution may be at room temperature or at an elevated temperature up to its boiling point. The time of contact between the cellulose fiber material and the solution should be sufficient to permit substantial penetration or impregnation of the fibers. Generally, a contact time of 15 seconds to 10 minutes is adequate for impregnation, although longer treatment periods can be employed without adversely affecting the composition.

It has been found that the concentration of the active ingredients used in the treating solution may vary considerably with respect to the total ingredients and to individual additives. Although it is somewhat more difficult to achieve the desired impregnation from a very dilute solution, as compared to a more concentrated one, solutions containing as little as 1% active ingredients have been used. Generally, however, the solutions employed contain about 7.5% by weight of active ingredients.

The general composition of the treating solution when using the diamine and protein or starch is as follows in weight percent:

| | Percent |
|---|---|
| Diamine | 0.1–20 |
| Protein or aminized starch | 0.1–20 |
| Water | balance |

When using the phenolic compound as an additive, the treating solution has the following composition in weight percent:

| | Percent |
|---|---|
| Diamine | 0.1–20 |
| Protein or aminized starch | 0.1–20 |
| Phenolic compound | 0.1–2.5 |
| Water | balance |

While an aqueous treating solution is the most practical, other types of evaporable solvents can be substituted for water. Furthermore, the active ingredients can be suspended or dispersed in a liquid carrier and applied to the fibers in that state.

After the treating solution or liquid has been applied to the cellulose material for the desired period of time to provide adequate impregnation, the excess solution is removed or drained from the cellulose and the cellulose is dried, either at room temperature or at a suitable elevated temperature, to evaporate the solvent or carrier.

Generally the greater amount of active ingredients present the more the cellulose fibers are stabilized. However, because several different active ingredients are used in varying proportions in the treating solution, it is difficult to provide a meaningful quantitative indication of the degree of stabilization obtained. It has been found, however, that when the active ingredients are present in the amount of 0.7 to 20% by weight of the combined weight of fibers and active ingredients in the dry state, corresponding generally to 0.1% to 3.0% by weight of nitrogen, substantial improvement in the thermal stability of the fibers is obtained.

It is believed that the carboxyl groups on the protein, form amine salts with the diamine in the solution. When this solution is applied to the cellulose material and the solvent evaporated, the equilibrium is upset and amides are formed. Since a diamine is used, it can cross link the protein to produce a polymeric material which has improved thermal stability. It is thought that a similar reaction occurs with the cellulose which has carboxyl, hydroxyl and aldehyde functionality available to react with the amine to further increase thermal stability. In this case it is believed that cross linking also occurs.

It has also been found that when the treating solutions are evaporated to dryness, the resulting residue on the cellulose fibers is a thin, brittle sheet which if left in the open air becomes flexible after a time. This would seem to indicate that material takes on water from the air and this may explain why it is effective in stabilizing the cellulose fibers.

The following examples illustrate the process of the invention:

EXAMPLE 1

A sheet of kraft paper 8″ by 8″ and 5 mils thick was immersed in an aqueous solution containing 5% piperazine, 2.5% Adpro 410, an isolated soy protein, and 92.5% water until the paper had become thoroughly soaked or impregnated. The sheet was removed from the solution and allowed to air dry at room temperature. The impregnated sheet was then placed in a glass tube containing insulated copper wire 21″ (16 gauge Formvar coated) and copper foil (14″ by 1″ by 2 mils). This paper copper system was placed in an oven at 135° C. for 16 hours. During this time a pressure of 0.1 mm. was maintained within the tube. At the end of this drying period the evacuated tube containing this paper was filled under vacuum with an inhibited transformer oil, leaving an air space in the tube of approximately 15% of the total volume. The air space was then filled to 1 atmosphere pressure with dry air, and the tube was sealed off with an oxygen-gas torch.

The glass tube was then placed in an oven at 170° C. for 5 days. The heat-aged paper along with a control sample was tested for tensile strength retained.

The results of the test are summarized in the following table:

Table I

| Sample | Wt. percent of additives in solution | Hours aged at 170° C. | Tensile strength, p.s.i. | Percent of original strength retained |
|---|---|---|---|---|
| 1 | 0 | 0 | 40.1 | 100 |
| 2 | 0 (control) | 120 | 23.2 | 57.7 |
| 3 | (1) | 120 | 32.8 | 84.0 |

1 5% piperazine and 2.5% Adpro 410.

EXAMPLE 2

A sheet of kraft paper 8″ by 8″ and 5 mils thick was immersed in an aqueous solution containing 2% aminoethyl piperazine, 4% Adpro 410, and 0.2% p-aminophenol and 93.8% water until the paper was thoroughly soaked or impregnated. This sheet was air dried and sealed in the glass tube in a manner set forth in Example 1.

The glass tube was then placed in an oven at 170° C. for 5 days and the heat-aged paper, along with the control sample, was tested for tensile strength retained. The results of the test are summarized in the following table:

Table II

| Sample | Wt. percent of additives in solution | Hours aged at 170° C. | Tensile strength, p.s.i. | Percent of original strength retained |
|---|---|---|---|---|
| 1 | 0 | 0 | 40.1 | 100 |
| 2 | 0 | 120 | 23.2 | 57.7 |
| 3 | (1) | 120 | 37.2 | 92.6 |

1 2% amino ethyl piperazine, 4.0% Adpro 410 and 0.2% p-aminophenol.

The tabulated results clearly illustrate the improved thermal aging characteristics of the cellulose fiber materials treated in accordance with the invention. For example, in Table I, the control sample which was not treated, retained only 57.7% of its original strength after aging at 170° C. for 5 days, while the sample treated in accordance with the invention retained 84% of its original strength. Similarly, the results in Table II illustrate that the material treated with the aminoethyl piperazine, protein and p-aminophenol retained 92.6% of its original strength after aging at 170° C. for 5 days.

The cellulose treated in accordance with the invention when used as an insulation material in a transformer extends the useful life of the unit for a given transformer loading. Stated in another way, the insulation permits a given size unit to be operated at higher loads and temperatures.

Although the invention is directed specifically to treating cellulose insulating materials, it is understood that the invention also embraces stabilizing other forms of cellulosic fibers.

Various modes of carrying out the invention are contemplated as being within the scope of the following claims particularly pointing out and distinctly claiming the subject matter which is regarded as the invention.

I claim:

1. The method of increasing the thermal stability of cellulosic materials, comprising the step of applying to the cellulosic material a diamine having the following formula:

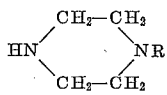

where R is selected from the group consisting of H and an alkyl group having from 1 to 6 carbon atoms.

2. The method of increasing the thermal stability of cellulosic materials, comprising the step of applying to the cellulosic material the combination of a diamine having the following formula:

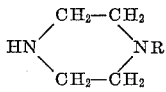

where R is selected from the group consisting of H and an alkyl group having from 1 to 6 carbon atoms, and a material selected from the group consisting of a protein and an aminized starch.

3. The method of increasing thermal stability of cellulose fibers, comprising the step of applying to the fibers a mixture of a diamine having the following formula:

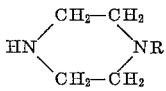

where R is selected from the group consisting of H and an alkyl group having from 1 to 6 carbon atoms, a protein and a phenolic compound, said mixture comprising from 0.7 to 20% by weight of the combined weight of said cellulose fibers and said mixture in the dried state.

4. A method of increasing the thermal stability of cellulose fiber materials, which comprises applying to the fibers an aqueous solution of a diamine having the following formula:

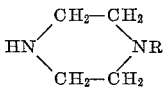

where R is selected from the group consisting of H and an alkyl group having from 1 to 6 carbon atoms, a protein and a phenolic compound, and thereafter evaporating the water.

5. The method of increasing the thermal stability of cellulosic materials, comprising the step of impregnating the cellulosic material with piperazine.

6. The method of increasing the thermal stability of cellulosic materials, comprising the step of impregnating the cellulosic material with amino ethyl piperazine.

7. The method of increasing the thermal stability of cellulosic materials, comprising the step of impregnating the cellulosic material with the combination of piperazine and an isolated soy protein.

8. A method of increasing the thermal stability of cellulosic material, comprising the steps of preparing an aqueous solution having the following formula in weight percent:

|  | Percent |
|---|---|
| Cyclic diamine | 0.1–20.0 |
| Protein | 0.1–20.0 |
| Water | balance | said cyclic diamine having the following formula:

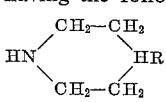

where R is selected from the group consisting of H and an alkyl group having from 1 to 6 carbon atoms, contacting the cellulosic material with the solution for a period of time sufficient to impregnate said material, and thereafter evaporting the water.

9. A method of increasing the thermal stability of cellulosic material, comprising the steps of preparing an aqueous solution having the following formula in weight percent:

|  | Percent |
|---|---|
| Cyclic diamine | 0.1–20.0 |
| Cationic starch | 0.1–20.0 | said cyclic diamine having the following formula:

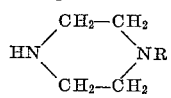

where R is selected from the group consisting of H and an alkyl group having from 1 to 6 carbon atoms, contacting the cellulosic material with the solution for a period of time sufficient to impregnate said material, and thereafter evaporating the water.

10. A method of increasing the thermal stability of cellulosic material, comprising the steps of preparing an aqueous solution consisting essentially of 0.1 to 20.0% of a cyclic diamine having the following formula:

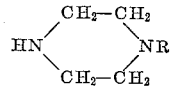

where R is selected from the group consisting of H and an alkyl group having from 1 to 6 carbon atoms, 0.1 to 20.0% of a water soluble material selected from the group consisting of a protein and a cationic starch, 0.1 to 2.5% of a water soluble phenolic compound having anti-oxidant properties and the balance being water, contacting the cellulosic material with the solution to impregnate the cellulose fibers, and drying the cellulose material to evaporate the water.

11. A method of increasing the thermal stability of cellulose fibers, comprising the steps of contacting the cellulose fibers with a material consisting of 0.1 to 20.0% of a cyclic diamine having the following formula:

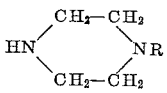

where R is selected from the group consisting of H and an alkyl group having from 1 to 6 carbon atoms, 0.1 to 20.0% of a substance selected from the group consisting of a protein and a cationic starch, and the balance being a liquid carrier, and thereafter drying said fibers to evaporate said carrier.

12. The method of claim 3, in which the phenolic compound is selected from the group consisting of acetyl aminophenol, cresol, phenol and aminophenol.

13. A cellulose fiber product having increased thermal stability prepared by treating the cellulose fibers with a cyclic diamine having the following formula:

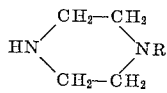

where R is selected from the group consisting of H and an alkyl group having from 1 to 6 carbon atoms.

14. A cellulose fiber product having increased thermal stability prepared by treating the cellulose fibers with the combination of a cyclic diamine having the following formula:

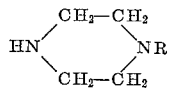

where R is selected from the group consisting of H and an alkyl group having from 1 to 6 carbon atoms, and a material selected from the group consisting of a protein and a cationic starch.

15. A cellulose fiber product having increased thermal stability prepared by treating the cellulose fibers with a water solution of a cyclic diamine having the following formula:

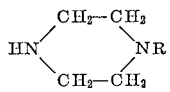

where R is selected from the group consisting of H and an alkyl group having from 1 to 6 carbon atoms, a material selected from the group consisting of a protein and a cationic starch, and a water soluble anti-oxidizing phenolic compound, and thereafter evaporating the water.

16. In an encased electrical instrumentality including cooperating conductors and a liquid dielectric, cellulose fiber insulation material having improved thermal stability and prepared by treating the cellulose fibers with the combination of a cyclic diamine having the following formula:

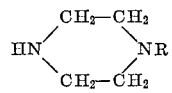

where R is selected from the group consisting of H and an alkyl group having from 1 to 6 carbon atoms, and a material selected from the group consisting of a protein and a cationic starch, said insulation material containing from 0.1 to 3.0% by weight of nitrogen.

17. In an encased electrical instrumentality including cooperating conductors and a liquid dielectric, cellulose fiber insulation material having improved thermal stability and prepared by treating the cellulose fibers with the combination of a cyclic diamine having the following formula:

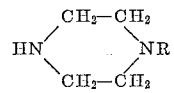

where R is selected from the group consisting of H and an alkyl group having from 1 to 6 carbon atoms, a material selected from the group consisting of a protein and a cationic starch, and a phenolic compound selected from the group consisting of acetyl aminophenol, cresol, phenol and aminophenol.

References Cited by the Examiner

UNITED STATES PATENTS

| | | | |
|---|---|---|---|
| 1,666,082 | 4/28 | Bodmer | 8—118 |
| 1,666,083 | 4/28 | Bodmer | 8—118 |
| 1,768,910 | 7/30 | Ihrig | 252—63.7 |
| 1,805,953 | 5/31 | Morton | 252—63.7 |
| 1,880,047 | 9/32 | Richter | 8—115.5 |
| 2,050,196 | 7/36 | Sebrell | 8—116.2 |
| 2,062,201 | 11/36 | Bartram | 252—63.7 |
| 2,246,070 | 6/41 | Schlack | 8—115.5 |
| 2,316,587 | 4/43 | Irigai | 262—63.7 |
| 2,572,808 | 10/51 | Jackson | 252—63.7 |
| 2,627,504 | 2/53 | Hardy | 252—63.7 |
| 3,135,627 | 6/64 | Sadler | 8—116.2 X |

FOREIGN PATENTS 502,838  3/39  Great Britain.

NORMAN G. TORCHIN, *Primary Examiner.*

ABRAHAM H. WINKELSTEIN, *Examiner.*

UNITED STATES PATENT OFFICE
CERTIFICATE OF CORRECTION

Patent No. 3,211,516

October 12, 1965

Fred S. Sadler

It is hereby certified that error appears in the above numbered patent requiring correction and that the said Letters Patent should read as corrected below.

Column 5, lines 69 to 73, the formula should appear as shown below instead of as in the patent:

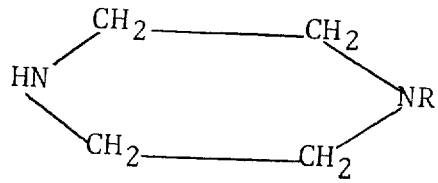

(SEAL)    Signed and sealed this 16th day of August 1966.

Attest:

ERNEST W. SWIDER
Attesting Officer

EDWARD J. BRENNER
Commissioner of Patents